(12) United States Patent
Hikichi

(10) Patent No.: US 11,789,673 B2
(45) Date of Patent: Oct. 17, 2023

(54) IMAGE FORMING APPARATUS, CONTROL METHOD OF IMAGE FORMING APPARATUS, AND STORAGE MEDIUM STORING PROGRAM HAVING TRANSITION EVENT OCCURRING DURING SWITCHING PROCESS OF POWER STATE

(71) Applicant: CANON KABUSHIKI KAISHA, Tokyo (JP)

(72) Inventor: Atsushi Hikichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 17/900,383

(22) Filed: Aug. 31, 2022

(65) Prior Publication Data

US 2023/0115040 A1   Apr. 13, 2023

(30) Foreign Application Priority Data

Sep. 24, 2021 (JP) .................................. 2021-155059

(51) Int. Cl.
*G06F 3/12* (2006.01)

(52) U.S. Cl.
CPC .............. *G06F 3/122* (2013.01); *G06F 3/1221* (2013.01); *G06F 3/1229* (2013.01)

(58) Field of Classification Search
CPC ........ G06F 3/122; G06F 3/1221; G06F 3/1229
USPC ........................................................ 358/1.14
See application file for complete search history.

(56) References Cited

U.S. PATENT DOCUMENTS

| 2014/0029043 A1* | 1/2014 | Nagami ............. H04N 1/00899 |
| | | 358/1.14 |
| 2015/0213346 A1* | 7/2015 | Yamasaki ............ G06F 1/3287 |
| | | 358/1.14 |
| 2018/0183963 A1* | 6/2018 | Yamashita ........... G06F 3/1279 |

FOREIGN PATENT DOCUMENTS

JP    2012178697 A    9/2012

* cited by examiner

*Primary Examiner* — Allen H Nguyen
(74) *Attorney, Agent, or Firm* — Rossi, Kimms & McDowell LLP

(57) ABSTRACT

Upon receiving a resumption notification from a system controller, a printer driver determines whether a power supply to a printer apparatus has stopped/resumed after a previous transition instruction to a sleep state was transmitted to the printer apparatus. If stop/resumption is not performed, an initialization negotiation processing performed to the printer apparatus when stop/resumption is not performed.

7 Claims, 12 Drawing Sheets

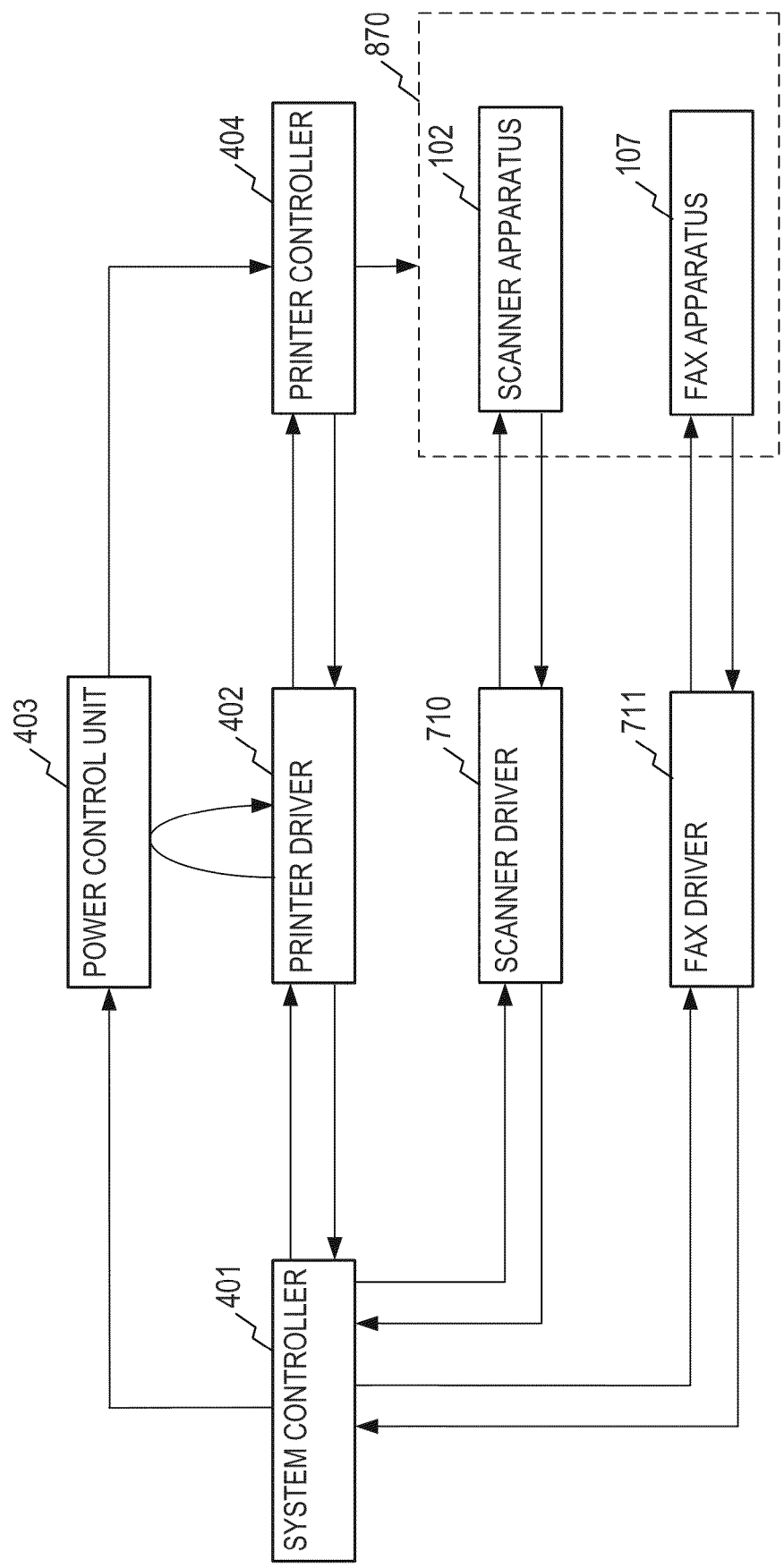

IMAGE FORMING APPARATUS, CONTROL METHOD OF IMAGE FORMING APPARATUS, AND STORAGE MEDIUM STORING PROGRAM HAVING TRANSITION EVENT OCCURRING DURING SWITCHING PROCESS OF POWER STATE

BACKGROUND OF THE INVENTION

This application claims the benefit of Japanese Patent Application No. 2021-155059, filed Sep. 24, 2021, which is hereby incorporated by reference herein in its entirety.

Field of the Invention

The present invention relates to an image forming apparatus, a method for controlling the image forming apparatus, and a non-transitory storage medium.

Description of the Related Art

In recent years, image forming apparatuses have advanced functions and high expandability such as facsimile functions and user authentication functions using devices, in addition to functions such as copying, scanning, and printing. In addition, the image forming apparatus is improved in function to improve user convenience, a power-saving function to reduce environmental load is added to the image forming apparatus, and the number of parts is reduced to reduce cost in order to make the price easy for the user to buy.

Japanese Patent Application Laid-Open No. 2012-178697 proposes a technique for shortening the time required for resetting the parameters to the device which has been turned off or reset by resetting, after resuming form the sleep state, the parameters stored before the transition to sleep state.

However, although Japanese Patent Application Laid-Open No. 2012-178697 discloses a technique for shortening a time for resetting a parameter of a device that has been turned off or reset, the technique does not correspond to a case where the device has not been turned off or reset.

For example, the device may cancel the transition to the sleep state and resume from the sleep transition state in response to occurring a resumption factor from sleep in the middle of a sleep transition. In this case, the device may not have been powered off or reset.

A prior art will now be described with reference to an image forming apparatus having a system controller for controlling the image forming apparatus and a printer driver for controlling the printer unit, and for turning off the power of the printer unit upon transition to a sleep state.

When the image forming apparatus transitions to a sleep state, the system controller notifies the printer unit of the transition to sleep state via the printer driver. The system controller turns off the power of the printer unit after receiving the response of completion from the printer unit via the printer driver. When resuming from the sleep state, the system controller turns on the power of the printer unit and notifies the printer driver of the resuming. In response to this notification, the printer driver performs initial processing on the printer unit to resume communication with the printer unit. Note that, as described above, when a resumption factor from the sleep state occurs in the middle of the transition to the sleep state and the image forming apparatus cancels the transition to the sleep state and resumes from the transition to the sleep state, there is a possibility that the printer unit is not yet turned off and no initial processing is required. However, the printer driver does not know whether or not the printer unit is turned off. For example, the system controller may turn off the power of each device including the printer unit after asynchronously receiving a completion response to the sleep notification from not only the printer unit but also other devices. The printer driver cannot accurately know the power-off timing of the printer unit. Therefore, conventionally, since the printer driver has already notified the printer unit of the transition to the sleep state, the printer driver performs the initialization processing even when the initialization processing of the printer unit is not necessary at the time of resuming from the sleep state, and there is a problem that the resuming from the sleep state takes a useless time.

The present invention has been made to solve the above problems. The present invention provides a mechanism capable of quickly resuming an image forming apparatus from the sleep state by eliminating wasteful processing when the image forming apparatus resumes from the sleep state.

SUMMARY OF THE INVENTION

According to an aspect of the present invention, an image forming apparatus including a printer unit, capable of switching between a first power state in which power is supplied to the printer unit and a second power state in which the power is not supplied to the printer unit and comprises a memory and at least one processor in communication with the memory, wherein the at least one processor is configured to control the image forming apparatus and control the printer unit to transmit first instruction to the printer unit in response to receiving the first instruction to transition to the second power state and resume communication with the printer unit in response to receiving second instruction to transition to the first power state, wherein an initialization processing of the printer unit is executed by second the first instruction to the printer which is received when the power supply to the printer unit is stopped by first the first instruction and the resumed, wherein the initialization processing of the printer unit is not executed by second the first instruction to the printer which is received when the power supply to the printer unit is still supplied by first the first instruction.

Further features of the present invention will become apparent from the following description of exemplary embodiments with reference to the attached drawings.

BRIEF DESCRIPTION OF THE DRAWINGS

FIG. 12 illustrates a diagram illustrating the sleep transition operation and the resume operation according to a third embodiment.

DESCRIPTION OF THE EMBODIMENTS

Hereinafter, an embodiment of the present invention will be described with reference to the drawings.

First Embodiment

System Configuration

Figure 1:
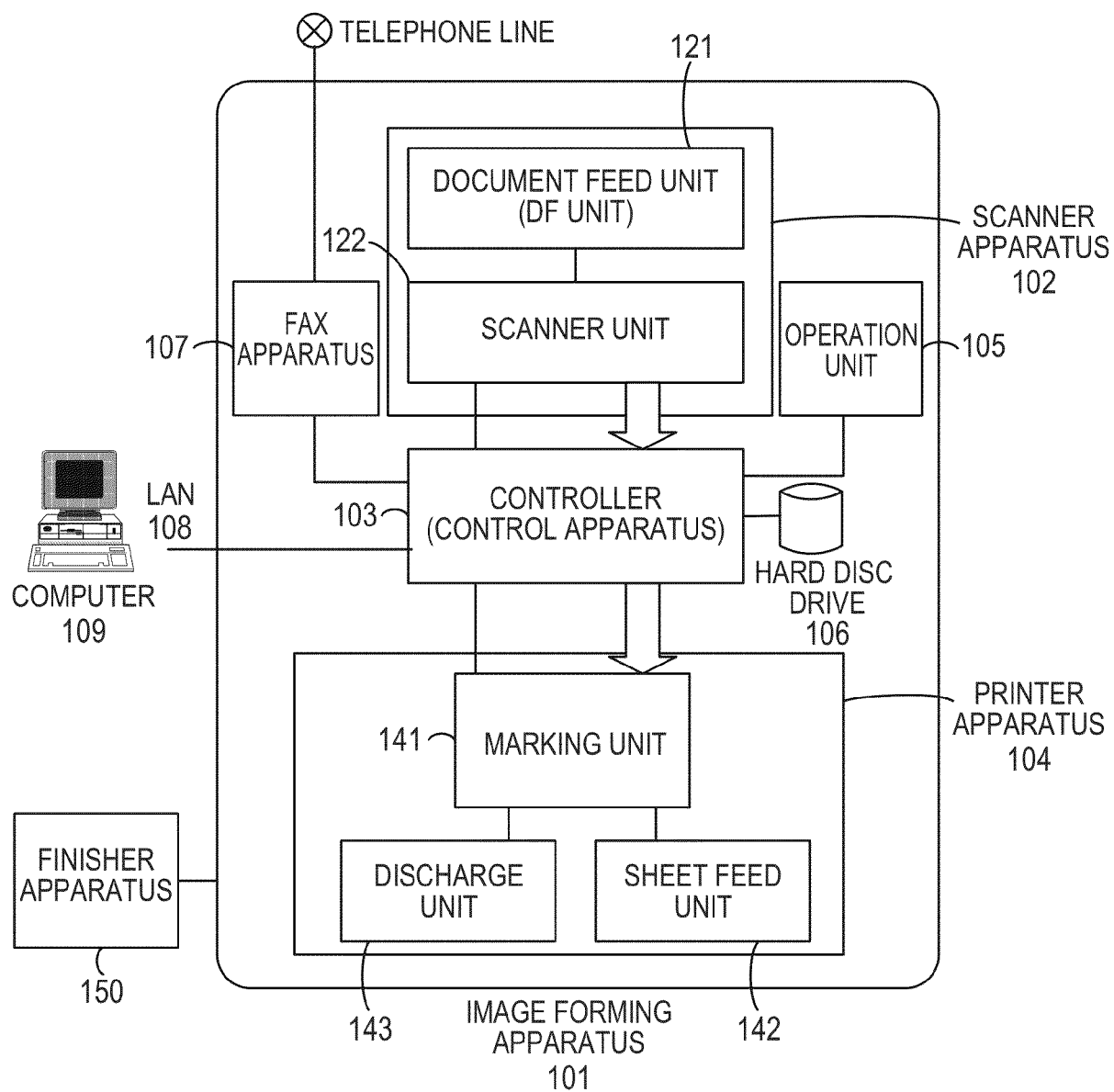
FIG. 1 illustrates a block diagram of an example of a configuration of a system including an image forming apparatus illustrating an embodiment of the present invention.

FIG. 1 illustrates a block diagram of an example of a configuration of a system including an image forming apparatus according to an embodiment of the present invention. Here, as an example of the image forming apparatus of the present embodiment, a multifunctional apparatus having a print function, a scanner function, a data communication function, and the like will be described, but the present invention is not limited thereto.

An image forming apparatus 101 can communicate with a computer 109 via a LAN 108 and can receive jobs from the computer 109. The number of computer connections may be two or more. The image forming apparatus 101 includes modules such as a controller 103, a scanner apparatus 102, a printer apparatus 104, an operation unit 105, a hard disk 106, and a FAX apparatus 107.

The scanner apparatus (scanner unit) 102 optically scans an image from a document and converts scanned image into a digital image. The printer device (printer unit) 104 outputs a digital image to a sheet or the like. The operation unit 105 includes a touch panel and a hard key for receiving a setting to the image forming apparatus 101 from a user and displaying a processing state.

A hard disk 106 stores digital images, control programs and the like (hereinafter referred to as "HDD"). Instead of or in combination with the HDD 106, other non-volatile storage devices such as SSD (Solid State Drive) or eMMC (embedded MultiMediaCard) may be provided. The FAX apparatus 107 transmits and receives a digital image via a telephone line or the like.

The controller 103 is connected to the scanner apparatus 102, the printer apparatus 104, the operation unit 105, the HDD 106, and the FAX apparatus 107, and is a control unit that executes a job on the image forming apparatus 101 by issuing an instruction to each module.

The image forming apparatus 101 can communicate with the computer 109 via the LAN 108, and can input and output digital images, issue jobs, instruct equipment, and the like by communicating with the computer 109.

The scanner apparatus 102 includes a document feed unit (DF unit) 121 capable of automatically sequentially replacing a document bundle, and a scanner unit 122 capable of optically scanning a document and converting the document into digital image data. The image data converted by the scanner unit 122 is transmitted to the controller 103.

The printer apparatus 104 has a sheet feed unit 142 capable of sequentially feeding sheets or the like from a sheet bundle one by one, a marking unit 141 for printing image data on the fed sheet, and a discharge unit 143 for discharging the printed sheet. The finisher device 150 performs processing such as sheet discharge, sorting, stapling, punching and cutting on the sheet output from the discharge unit 143 of the printer apparatus 104 of the image forming apparatus 101.

The image forming apparatus 101 has a power supply switch 110 (FIG. 3) for controlling power supply of the power source. When the power supply switch 110 is turned off, the image forming apparatus 101 stops feeding power to the printer apparatus 104 or the like, for example, after waiting for completion processing of software or hardware. The details will be described with reference to FIG. 3.

System Function

An example of an executable job (function) of the image forming apparatus 101 will be described below.

Copy Function

The image forming apparatus 101 has a copying function for storing an image scanned from the scanner apparatus 102 in the HDD 106 and simultaneously performing printing by using the printer apparatus 104.

Image Transmitting Function

The image forming apparatus 101 has an image transmission function for transmitting an image scanned from the scanner apparatus 102 to the computer 109 via the LAN 108.

Image Storing Function

The image forming apparatus 101 has an image storing function for storing an image scanned from the scanner apparatus 102 in the HDD 106 and transmitting or printing the image as necessary.

Image Printing Function

The image forming apparatus 101 has an image printing function for analyzing, for example, a page description language transmitted from the computer 109 and printing the transmitted data by the printer apparatus 104.

Configuration of the Operation Unit 105

The operation unit 105 is connected to the controller 103, has an LCD touch panel, a power saving key, a copy button, a cancel button, a reset button, a numeric keypad, a user mode key, and the like, and provides a user I/F for operating the image input/output system. These keys may be hardware keys or software keys displayed on the LCD, but the presence of a hardware key is not required.

Block Diagram of the Controller 103

Figure 2:
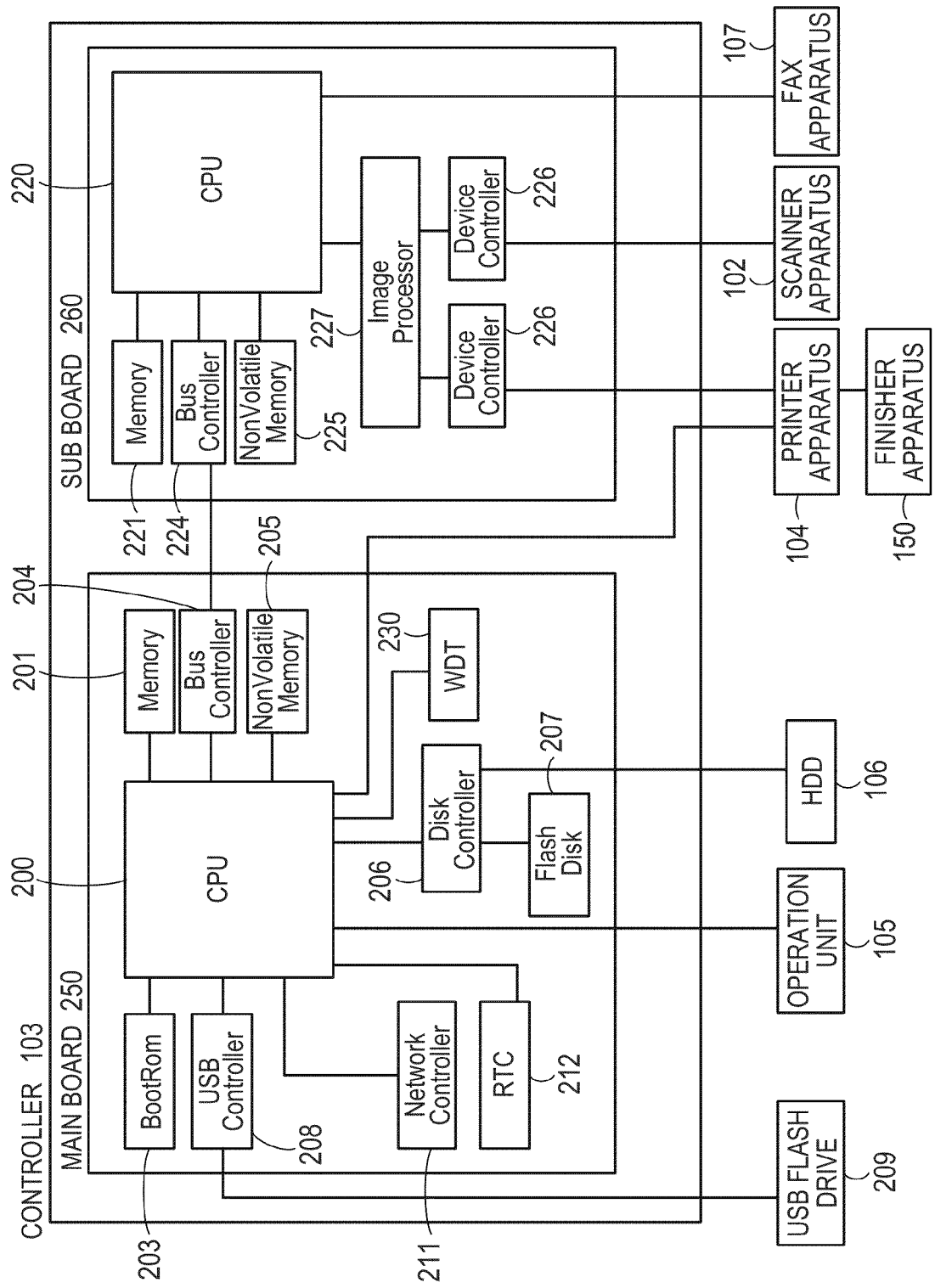
FIG. 2 illustrates a block diagram of an example of a configuration of a controller and a peripheral device.

Next, a block diagram of the controller 103 and the peripheral device will be described with reference to FIG. 2. FIG. 2 illustrates a block diagram of an example of a configuration of the controller 103 and the peripheral device. The controller 103 has a main board 250 and a sub board 260.

The main board 250 is a so-called general-purpose CPU system. The main board 250 has a CPU 200, a boot ROM 203, a memory 201, a bus controller 204, and a non-volatile memory 205.

The CPU 200 controls the entire main board 250. The boot ROM 203 stores a boot program. The memory 201 is used as a work memory of the CPU 200. The bus controller 204 has a bridge function with an external bus. The non-volatile memory 205 is a storage device for storing various kinds of information, and stores the information even when the power is turned off.

The main board 250 includes a WDT 230, a disk controller 206, a flash disk 207, a USB controller 208, a network controller 211, an RTC 212, and the like.

The WDT 230 is a watchdog timer that monitors and resets the controller 103. The CPU 200 controls the WDT 230. The disk controller 206 controls storage devices such as the HDD 106 and the flash disk 207. The flash disk 207 is a relatively small-capacity storage device composed of a semiconductor device, such as an SSD or an eMMC. The USB controller 208 controls a USB device (for example, a USB flash drive 209). The network controller 211 controls the connection with the LAN 108 (hereinafter referred to as "NC"). The RTC 212 has a clock function. The main board 250 is externally connected to the USB flash drive 209, an operation unit 105, an HDD 106, and the like.

The sub board 260 comprises a relatively small general-purpose CPU system and image processing hardware. The sub board 260 includes a CPU 220, a memory 221, a bus controller 224, a non-volatile memory 225, an image processor 227, a device controller 226, and the like.

The CPU 220 controls the entire sub board 260. The memory 221 is used as a work memory by the CPU 220. The bus controller 224 has a bridge function with an external bus. The non-volatile memory 225 is a storage device for storing various kinds of information, and stores the information even when the power is turned off. An image processor 227 performs real-time digital image processing. A device controller 226 controls an external device. An external scanner apparatus 102 and a printer apparatus 104 transfer digital image data via the device controller 226. The CPU 220 directly controls the FAX apparatus 107.

FIG. 2 is a simplified block diagram. For example, a CPU 340, the CPU 220 and the like include many CPU peripheral hardware such as a chip set, a bus bridge, a clock generator and the like, but the description is simplified. The block diagram of FIG. 2 does not limit the present invention. The main board 250 may be integrated with the sub board 260, and in this case, the memory 201 and the memory 221 may be integrated.

The operation of the controller 103 will be described by way of example of image copying on the sheet or the like. When a user sets a sheet original in the scanner apparatus 102 and instructs scanning image from the operation unit 105, a CPU 200 transmits an image scanning instruction to the scanner apparatus 102 via the CPU 220. The scanner apparatus 102 optically scans the sheet original, converts the scanned image into digital image data, and inputs the digital image data to the image processor 227 via the device controller 226. The image processor 227 performs DMA transfer to the memory 221 via the CPU 220 to temporarily store the digital image data.

When it is confirmed that a certain amount or all of the digital image data has entered the memory 221, the CPU 200 issues an image output instruction to the printer apparatus 104 via the CPU 220. The CPU 220 informs the image processor 227 of the address of the image data in the memory 221. The image data on the memory 221 is transmitted to the printer apparatus 104 via the image processor 227 and the device controller 226 in accordance with a synchronization signal from the printer apparatus 104. The printer apparatus 104 prints digital image data on the sheet or the like.

When printing a plurality of copies, the CPU 200 stores the image data of the memory 221 in the HDD 106 or the like. After the second copy, the image data can be transmitted from the HDD 106 or the memory 221 to the printer apparatus 104 without receiving image data from the scanner apparatus 102.

Power Supply Configuration

Figure 3:
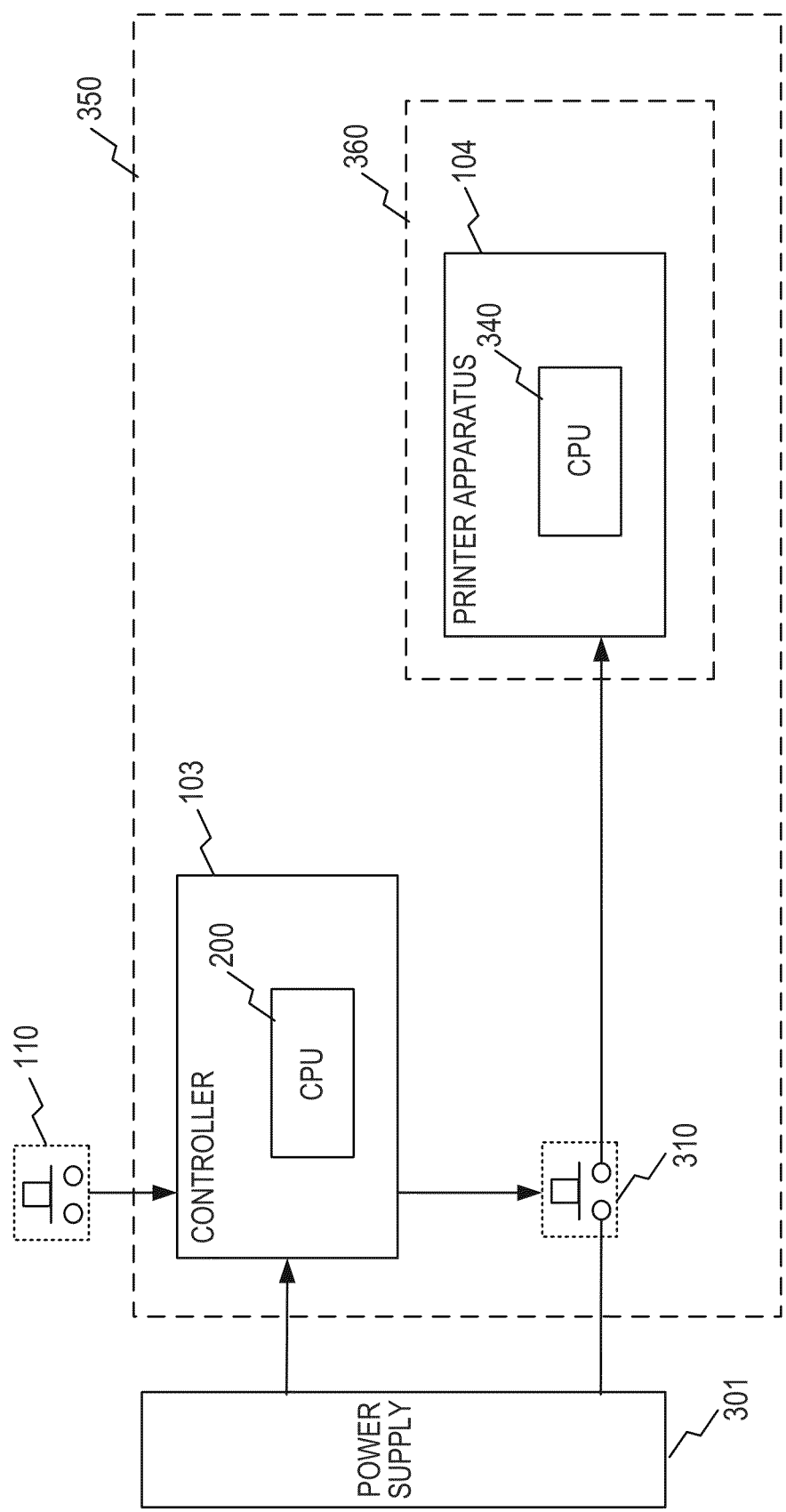
FIG. 3 illustrates a block diagram of an example of a power supply system of the image forming apparatus according to the first embodiment.

FIG. 3 illustrates a block diagram of an example of the power supply system of the image forming apparatus 101 according to the first embodiment. Hereinafter, with reference to FIG. 3, a portion related to the present invention will be described with respect to the power supply 301 and the power supply configuration to each apparatus in the image forming apparatus 101. In the figure, reference signs 350 and 360 denote a power supply block.

In the image forming apparatus 101, if the power supply switch 110 is pressed while the power supply is turned off, the power supply control unit (not shown) of the controller 103 detects that the power supply switch 110 is pressed and supplies power to the CPU 200 of the controller 103. The power supply control unit is always supplied with power from the power supply 301 via a power supply line. The activated CPU 200 controls the power supply switch 310 to supply power to the printer apparatus 104 and the CPU 340 of the printer apparatus 104. Here, the power supply switch 110 is, for example, a tact switch or a seesaw switch, and is turned ON/OFF by the user's pressing. The power supply switch 310 is, for example, a capacitor switch or a relay switch, and is switched ON/OFF by register control.

If the CPU 200 of the controller 103 determines that the transition to the sleep state is possible, the CPU 200 controls the power supply switch 310 to stop the power supply to the printer apparatus 104 and the CPU 340 of the printer apparatus 104. On the contrary, upon receiving a resumption event from the sleep state, the CPU 200 of the controller 103 controls the power supply switch 310 to start supplying power to the printer apparatus 104 and the CPU 340 of the printer apparatus 104.

In the image forming apparatus 101, if the power supply switch 110 is pressed while the power is turned on, the power control unit (not shown) of the controller 103 detects that the power supply switch 110 is pressed and notifies the CPU 200 of the controller 103 that the power supply switch 110 is pressed. The CPU 200 controls the power supply switch 310 to stop power supply to the printer apparatus 104 and the CPU 340 of the printer apparatus 104. The CPU 200 may individually control the power supply of the marking unit 141, the sheet feed unit 142, and the discharge unit 143 of the printer apparatus 104, but this will not be explained. In addition, a time lag may occur between when the ON/OFF of the power switch 310 is instructed and when the power of each device is turned OFF. This is because it takes time to discharge the capacitor. This time lag is monitored by the H/W configuration and S/W configuration, and it is guaranteed that the power supply of each device is turned off according to the power switch 110 ON/OFF instruction.

Operation of the First Embodiment

Figure 4:
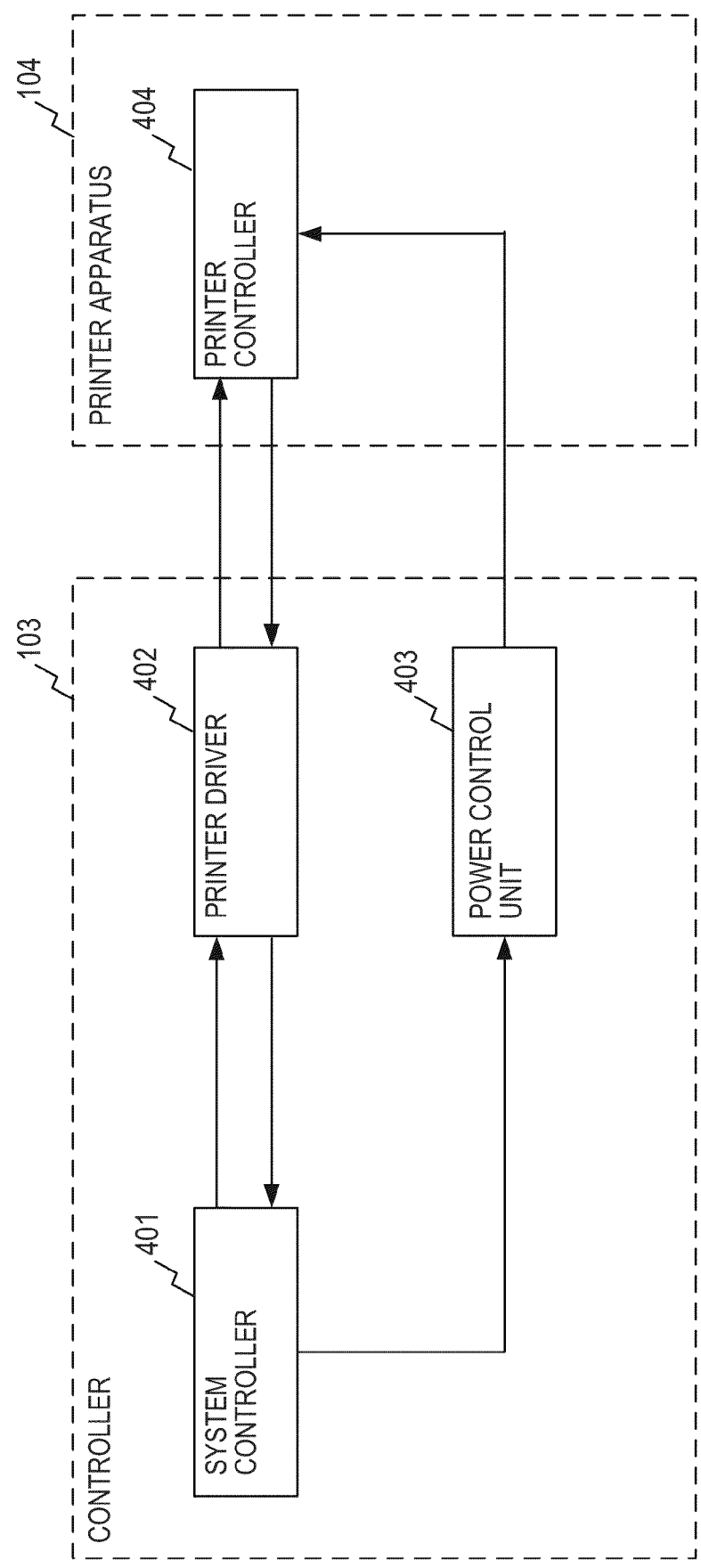
FIG. 4 illustrates a diagram illustrating sleep transition operation and a resume operation according to the first embodiment.
Figure 5:
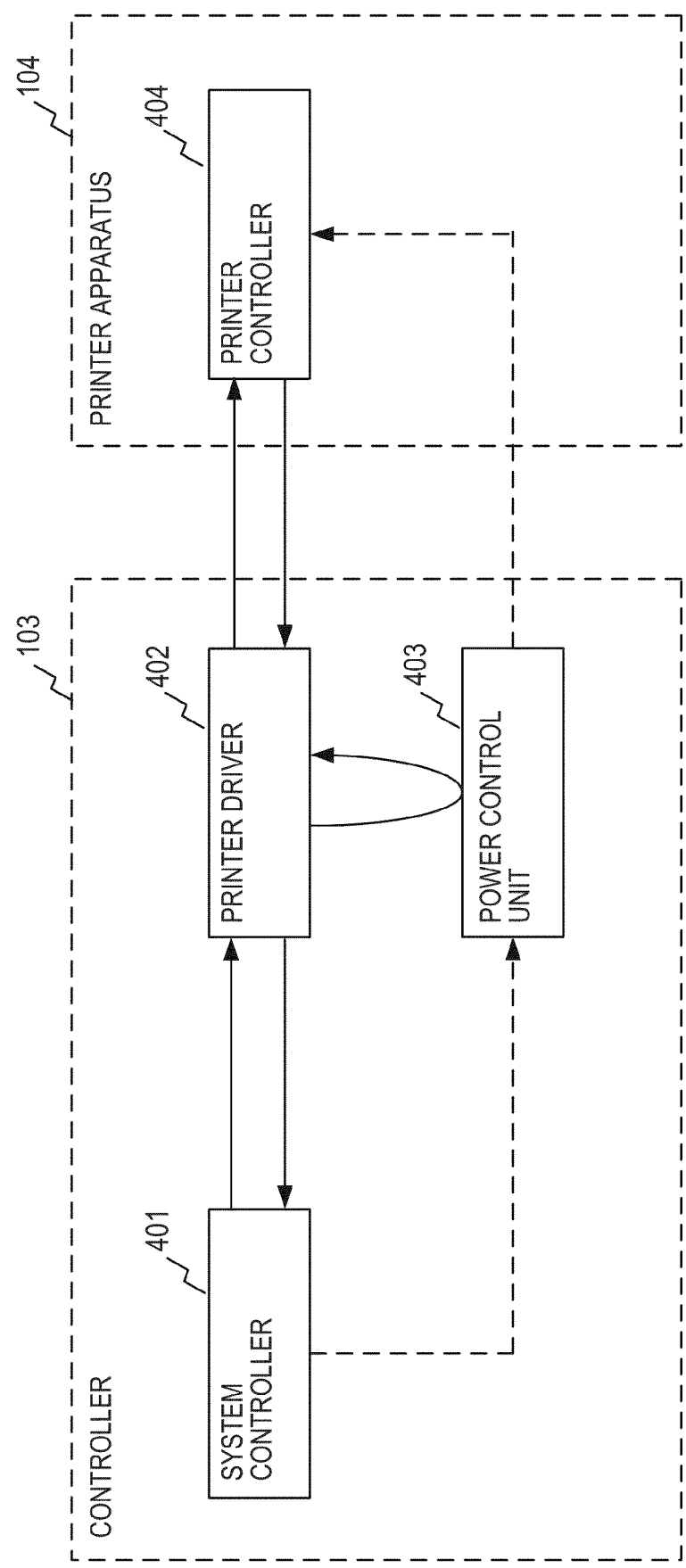
FIG. 5 illustrates a diagram illustrating the sleep transition operation and the resume operation according to the first embodiment.

FIGS. 4 and 5 illustrate diagrams of operation of the transition to the sleep state and operation of the resumption from the sleep state of the first embodiment based on the power supply system diagram shown in FIG. 3. As shown in FIGS. 4 and 5, the controller 103 of the image forming apparatus 101 includes a system controller 401 for software controlling the image forming apparatus 101, a printer driver 402 for software controlling the printer apparatus 104, and a power control unit 403. The system controller 401 is operated on the CPU 220. That is, the system controller 401 is realized by the CPU 200 executing a program read into the memory 201 from the HDD 106 or the like. The printer driver 402 is operated on the CPU 220. That is, the printer driver 402 is realized by the CPU 220 executing a program read into the memory 221 from the HDD 106 or the like. The power control unit 403 may be software running on the CPU 200 or may be configured to control a register of hardware such as an FPGA. The present embodiment will be described as software. That is, it is assumed here that the power control unit 403 is realized by the CPU 200 executing a program read into the memory 201 from the HDD 106 or the like.

The printer apparatus 104 has a printer controller 404 for software controlling the marking unit 141, the sheet feed unit 142 and the discharge unit 143 of the printer apparatus 104. That is, the printer controller 404 is realized by the CPU 340 executing a program stored in a ROM (not shown) or the like in the printer apparatus 104.

First, the transition to the sleep state will be described with reference to FIG. 4. After all the jobs are completed, the system controller 401 starts the transition to the sleep state. The transition to the sleep state may be another event such as the resolution of the sleep prohibited state, but the details are omitted. When the transition to the sleep state is started, the system controller 401 notifies the printer controller 404 of the transition to the sleep state via the printer driver 402. Thereafter, the printer controller 404 transmits a completion response of the transition to the sleep state to the system controller 401 via the printer driver 402. Upon receiving the completion response of the transition to the sleep state, the system controller 401 instructs the power control unit 403 to turn off the power of the printer apparatus 104. The power control unit 403 turns off the power of the printer apparatus 104 and latches (holds) that the power is turned off. For example, the power control unit 403 sets a predetermined storage area (for example, 1 bit) to a value indicating ON. When releasing the latch, the bit is set to a value indicating OFF.

A resumption from the sleep state will be described with reference to FIG. 5. After issuing the print job, the system controller 401 starts the resumption from the sleep state. In addition to the print job, the resumption from the sleep state may be performed in another event such as pressing a power saving key, but the details are omitted. When the system controller 401 receives the resumption from the sleep state, the system controller 401 instructs the power control unit 403 to turn on the power of the printer apparatus 104. The power control unit 403 turns on the power of the printer apparatus 104.

The system controller 401 notifies the printer driver 402 of the resumption from the sleep state. The printer driver 402 confirms with the power control unit 403 a latched state indicating whether or not the printer apparatus 104 has been turned off once (the power has been turned off or turned on even once after the previous transition to the sleep state was notified). When the information latched by the power control unit 403 indicates that "the power is turned off once", the printer driver 402 starts the process from the initialization negotiation with the printer apparatus 104. On the other hand, when the information latched by the power control unit 403 indicates that "the power is not turned off at all", the printer driver 402 skips the initialization negotiation with the printer apparatus 104 and performs printing communication.

Sequence of the First Embodiment

Figure 6:
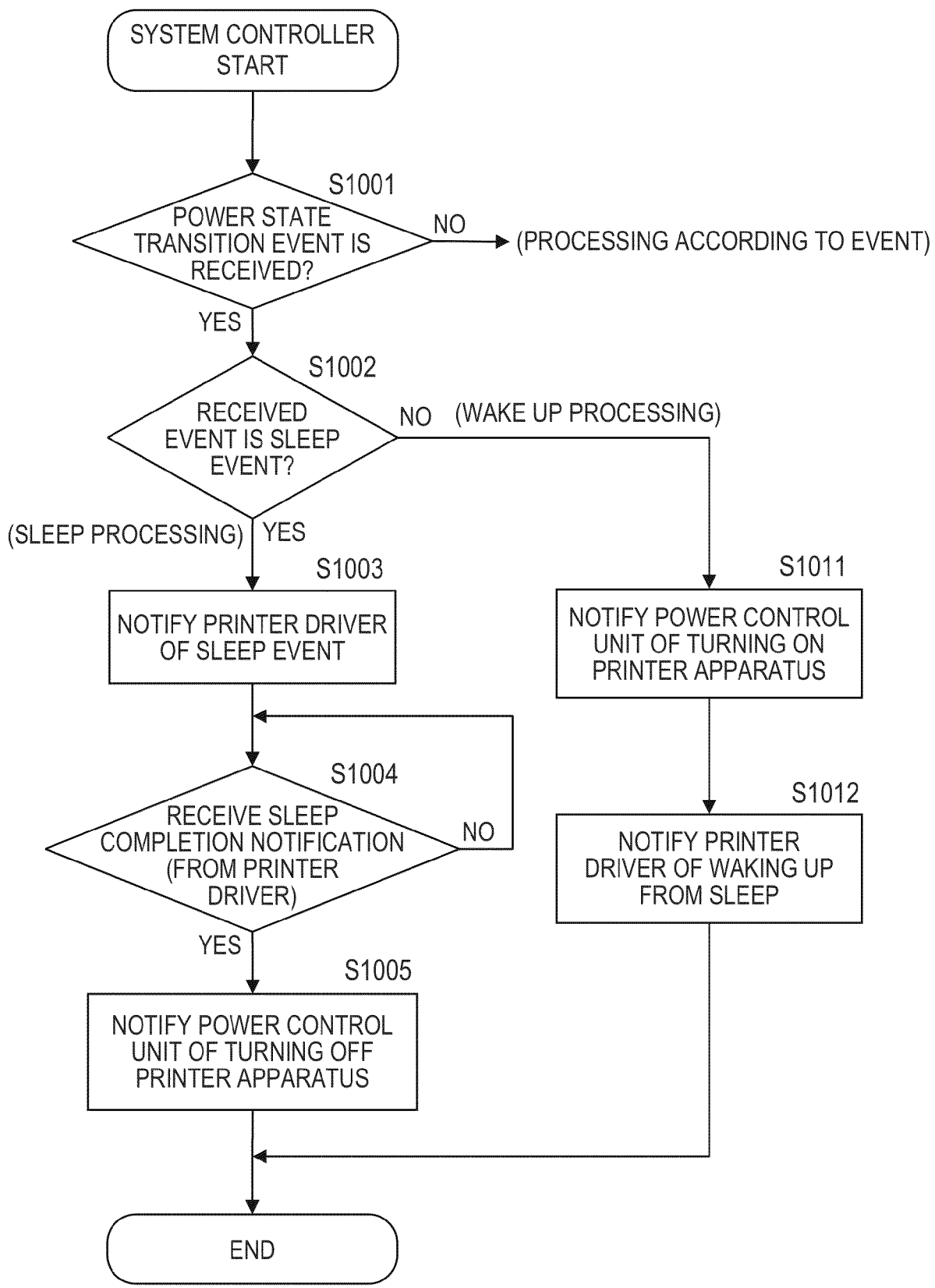
FIG. 6 illustrates a flowchart of an example of a system controller process.

The processing of the first embodiment will be described below with reference to FIGS. 6, 7 and 8. First, with reference to FIG. 6, the processing of the system controller 401 that operates on the CPU 200 of the controller 103 will be described. FIG. 6 illustrates a flowchart of an example of the processing of the system controller 401. The system controller 401 running on the CPU 200 starts the processing of this flowchart upon receipt of the event.

In step S1001, the system controller 401 checks whether the received event is a transition event of the power state. If it is not the transition event of the power state (No in step S1001), the system controller 401 performs processing (not shown) in accordance with the event.

On the other hand, if the received event is the transition event of power state (Yes in step S1001), the system controller 401 advances the processing to step S1002. In step S1002, the system controller 401 determines whether the received event is the transition to the sleep state (a sleep processing) or the resumption from the sleep state (a wake-up processing). If the received event is the transition to the sleep state ("the sleep processing" in step S1002), the system controller 401 advances the processing to step S1003. In step S1003, the system controller 401 transmits a sleep notification (a transition instruction to the sleep state) to the printer driver 402 running on the CPU 220.

Next, in step S1004, the system controller 401 waits for the completion notification of the transition to the sleep state from the printer driver 402 (No in step S1004), and when the completion notification of the transition to the sleep is received (Yes in step S1004), the process advances to step S1005. In step S1005, the system controller 401 notifies the power control unit 403 that the printer apparatus 104 is turned off.

If the received event is a resumption from the sleep state in step S1002 ("the wake-up processing" in step S1002), the system controller 401 advances the processing to step S1011.

In step S1011, the system controller 401 notifies the power control unit 403 that the printer apparatus 104 is turned on. Next, in step S1012, the system controller 401 notifies the printer driver 402 of the resumption from the sleep state.

Next, with reference to FIG. 7, the processing of the printer driver 402 that operates on the CPU 220 of the controller 103 will be described. The processing of the printer driver 402 shown in FIG. 7 most clearly shows the features of the present embodiment. In the present embodiment, the printer driver 402 checks with the power control unit 403 the power latch state indicating whether or not the power of the printer apparatus 104 or a part of the printer apparatus 104 is turned off when resuming from the sleep state. At this time, the printer driver 402 starts initialization negotiation when the power latch state indicates that "the power supply has been turned OFF once". On the other hand, when the power latch state indicates that "the power supply has never been turned off", the initialization negotiation process is skipped. The present invention has a foregoing feature.

Figure 7:
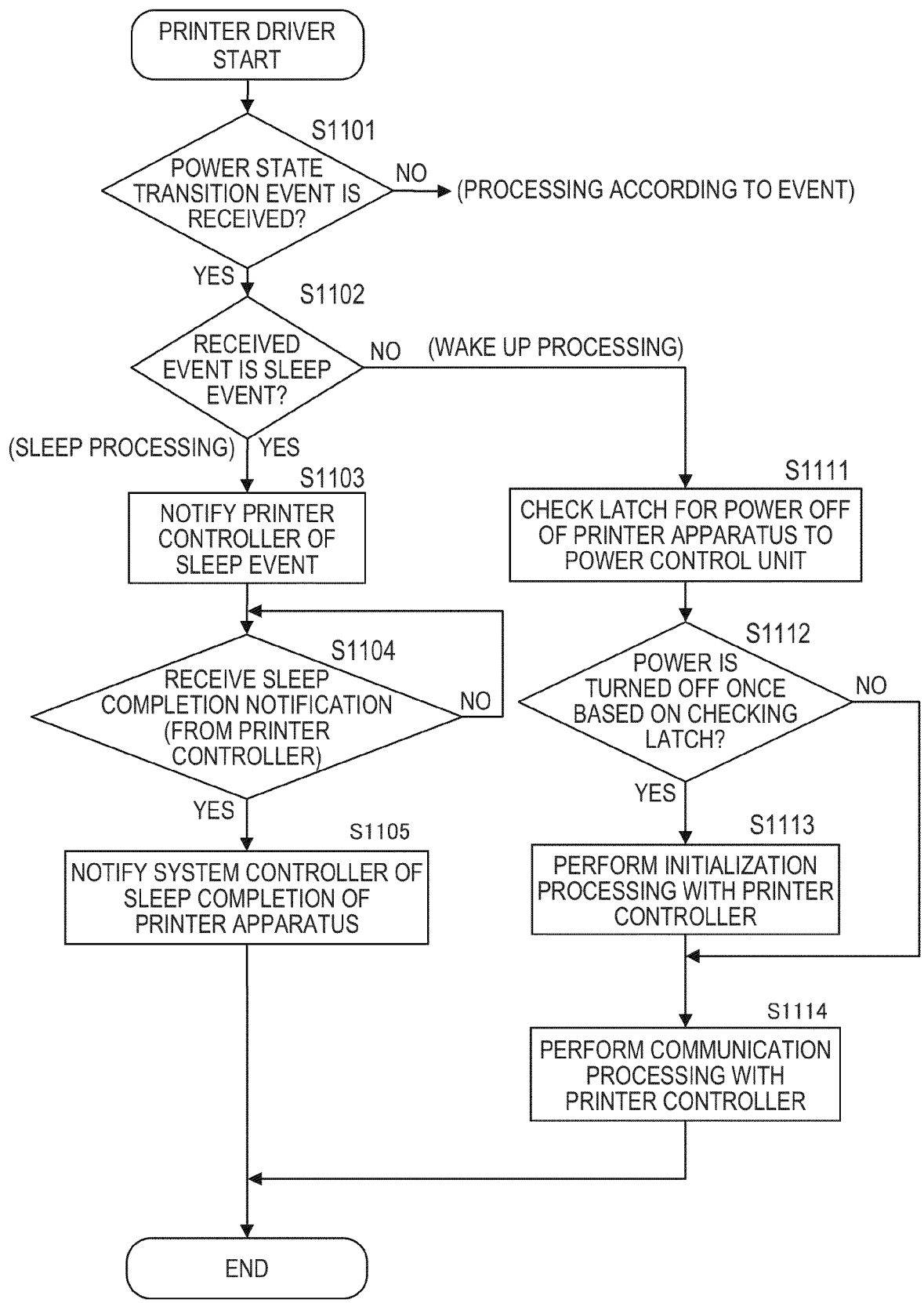
FIG. 7 illustrates a flowchart of an example of processing of a printer driver.
Figure 8:
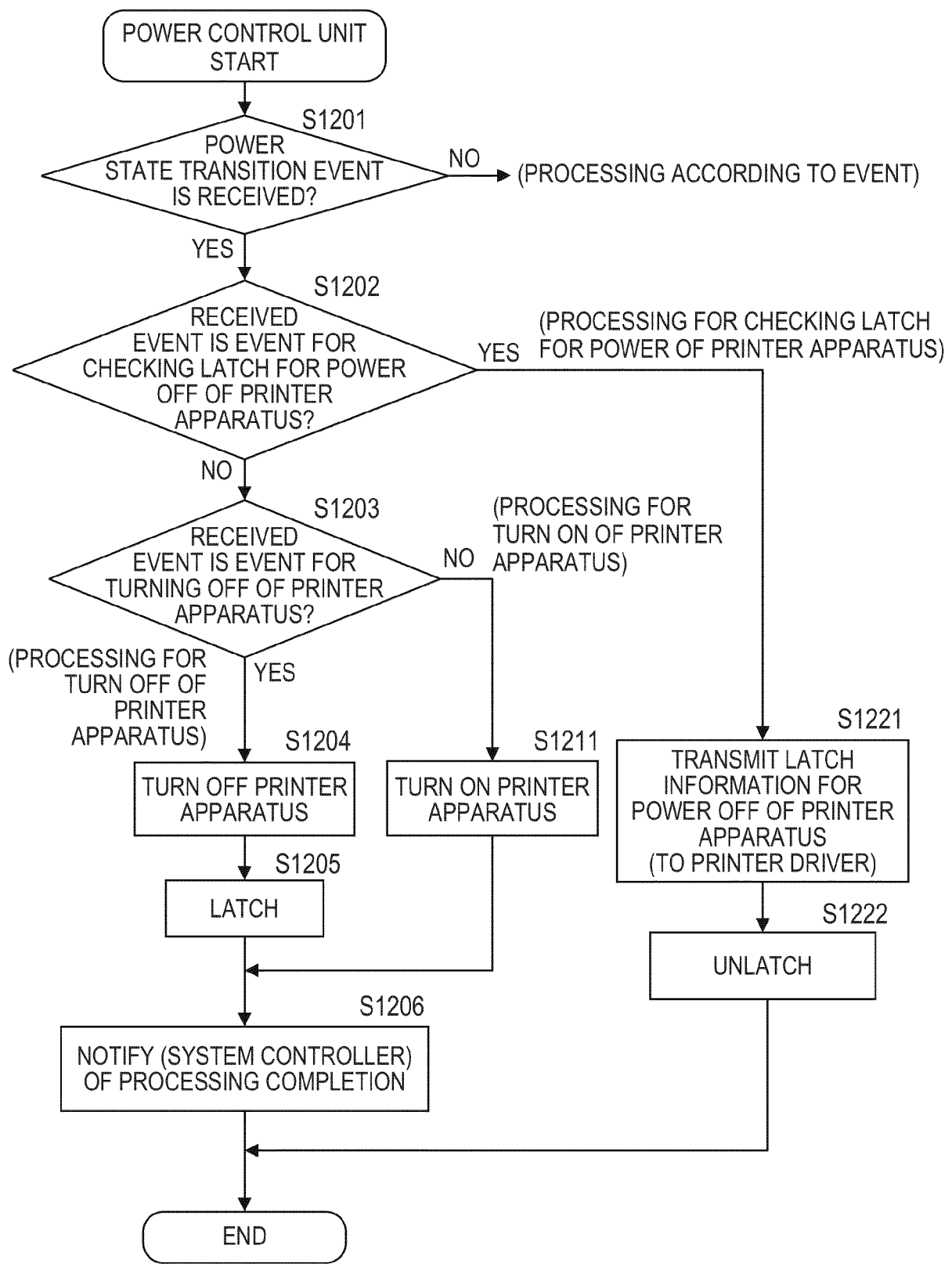
FIG. 8 illustrates a flowchart of an example of processing of a power control unit.

FIG. 7 illustrates a flowchart of an example of the processing of the printer driver 402. The printer driver 402 running on the CPU 220 starts the processing of this flowchart upon receiving an event from the system controller 401 running on the CPU 200. In step S1101, the printer driver 402 checks whether the received event is the transition event of the power state. If it is not the transition event of the power state (No in step S1101), the printer driver 402 performs processing (not shown) in accordance with the event.

On the other hand, if the received event is the transition event of the power state (Yes in step S1101), the printer driver 402 advances the processing to step S1102. In step S1102, the printer driver 402 determines whether the received event is a transition notification to the sleep state (the sleep processing) or a resumption notification from the sleep state (the wake-up processing). If the received event is the transition notification to the sleep state ("the sleep processing" in step S1102), the printer driver 402 advances the processing to step S1103.

In step S1103, the printer driver 402 transmits the transition notification to the sleep state (a transition instruction to the sleep state) to the printer controller 404 running on the CPU 340 of the printer apparatus 104.

Next, in step S1104, the printer driver 402 waits for a completion notification of the transition to the sleep state from the printer controller 404 (No in step S1104), and when the completion notification of the transition to the sleep state is received (Yes in step S1104), advances the processing to step S1105. In step S1105, the printer driver 402 notifies the system controller 401 of the CPU 200 of the completion of transition to the sleep state.

If the received event is a resumption notification from sleep state in step S1102 ("the wake processing" in step S1102), the printer driver 402 advances the processing to step S1111.

In step S1111, the printer driver 402 confirms the power OFF latch state of the printer apparatus 104 with the power control unit 403. Next, in step S1112, if it is confirmed that "the power is turned off once" in the confirmation of the power OFF latch state (Yes in step S1112), the printer driver 402 advances the process to step S1113. In step S1113, the printer driver 402 performs initialization processing with the printer controller 404, and in step S1114, performs communication processing with the printer controller 404 (step S1114).

On the other hand, if it is confirmed in step S1112 that "the power supply has never been turned off" by the confirmation of the power supply OFF latch state (No in step S1112), the printer driver 402 continues the communication processing to the printer controller 404 in step S1114. That is, in this case, the printer driver 402 skips the printer controller 404 and the initialization process.

Next, the processing of the power control unit 403 will be described with reference to FIG. 8. FIG. 8 illustrates a flowchart of an example of the processing of the power control unit 403. The power control unit 403 running on the CPU 200 starts this sequence upon receipt of the event.

In step S1201, the power control unit 403 checks whether the received event is a transition event of a power state. Here, it is assumed that the transition event of the power state includes the power OFF of the printer apparatus 104, the power ON of the printer apparatus 104, and the confirmation of the power OFF latch state of the printer apparatus 104. If the received event is not the transition event of the power state (No in step S1201), the power control unit 403 performs processing (not shown) in accordance with the event.

On the other hand, if the received event is the transition event of the power state (Yes in step S1201), the power control unit 403 advances the processing to step S1202. In step S1202, the power control unit 403 determines whether the received event is a confirmation of the power OFF latch state of the printer apparatus 104. If the received event is confirmation of the power OFF latch state of the printer apparatus 104 (Yes in step S1202), the power control unit 403 advances the process to step S1221.

In step S1221, the power control unit 403 transmits information indicating the power OFF latch state of the printer apparatus 104 to the printer driver 402, which is the transmission source, and advances the process to step S1222 to release the latch.

In step S1202, if the transition event of the power state is not a confirmation of the power OFF latch state of the printer apparatus 104 (No in step S1202), the power control unit 403 advances the process to step S1203.

In step S1203, the power control unit 403 checks whether or not the reception event is power OFF processing of the printer apparatus. If the reception event is the power OFF processing of the printer apparatus 104 (Yes in step S1203), the power control unit 403 advances the process to step S1204. In step S1204, the power control unit 403 turns off the power of the printer apparatus 104, and advances the process to step S1205. In step S1205, the power control unit 403 latches the power supply of the printer apparatus 104 to OFF, advances the process to step S1206, and notifies the system controller 401 of the completion of the process.

On the other hand, if the reception event is the power ON process of the printer apparatus 104 (No in step S1203), the power control unit 403 advances the process to step S1211. In step S1211, the power control unit 403 turns on the power of the printer apparatus 104, advances the process to step S1206, and notifies the system controller 401 of the completion of the process.

Effect of the First Embodiment

The printer driver 402 notifies the printer apparatus 104 of the transition to the sleep state, and if a resumption event is received before the power supply of the printer apparatus 104 is turned off, the power supply latch state of the printer apparatus 104 acquired from the power control unit 403 indicates that "the power supply has never been turned off". That is, it indicates that the power supply to the printer apparatus 104 remains ON (power supply to the printer apparatus 104 continues) after the previous transition notification to the sleep state. At this time, the printer driver 402 on the CPU 220 does not need the initialization negotiation process with the printer controller 404, so that the unnecessary initialization negotiation process can be omitted and the printer driver can be quickly restored. Conversely, when the printer driver 402 notifies the printer apparatus 104 of the transition to the sleep state and receives the resumption event after performing the power supply OFF processing of the printer apparatus 104, the power supply latch state of the printer apparatus 104 acquired from the power control unit 403 indicates that "the power supply has been turned OFF once". That is, after the previous transition notification to the sleep state, the printer apparatus 104 is turned off once and resumed to the power ON state (the power supply to the printer apparatus 104 is stopped and restarted). At this time, the printer driver 402 can correctly perform initialization negotiation processing with the printer controller 404, and can resume without causing a communication error. As described above, in the present embodiment, the wasteful processing at the time of the resumption from the sleep state of the image forming apparatus can be eliminated, and the user's usability can be improved by quickly resuming from the sleep state. Namely, the usability can be improved.

Second Embodiment

Power Supply Configuration of the Second Embodiment

Figure 9:
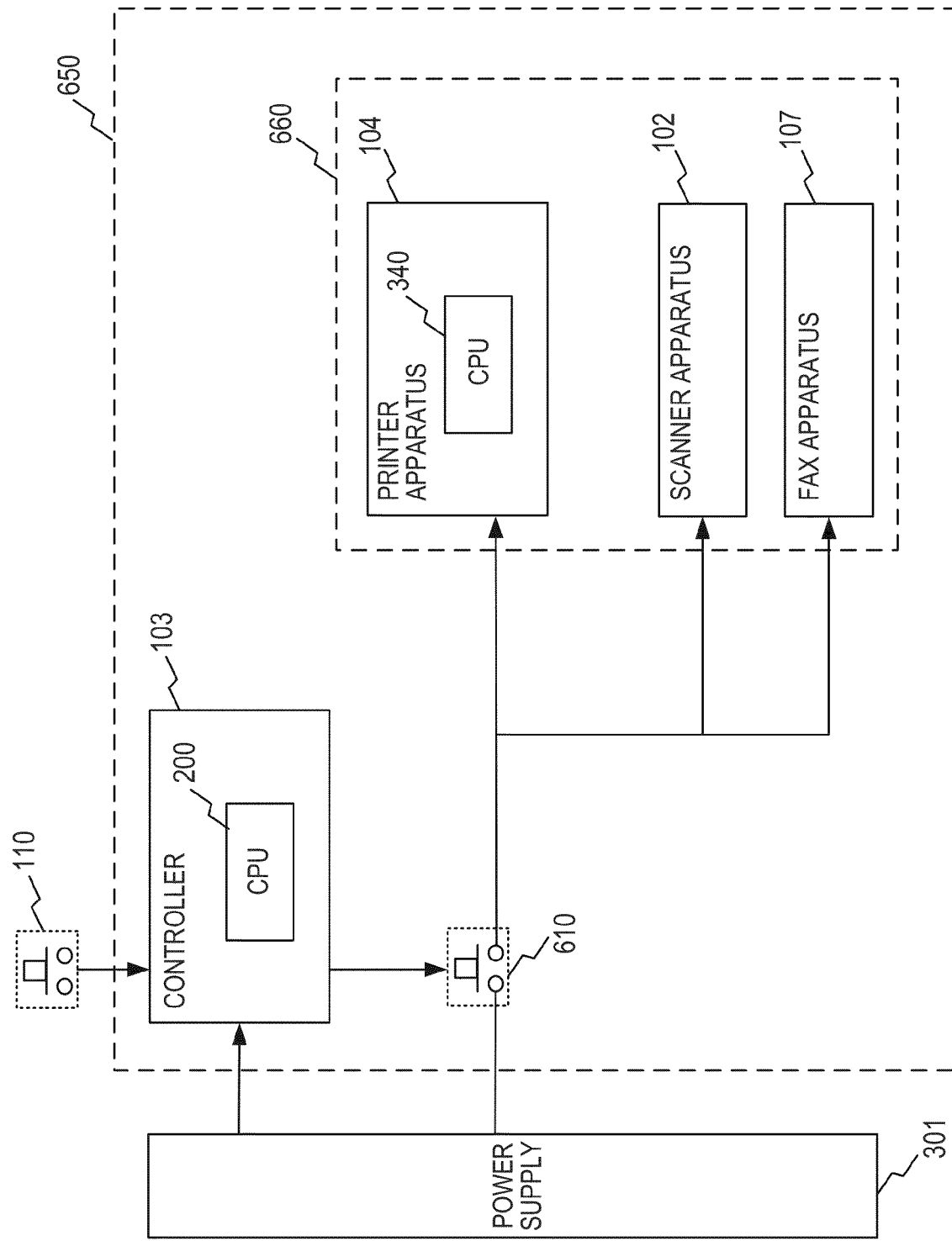
FIG. 9 illustrates a block diagram of an example of the power supply system of the image forming apparatus according to the second embodiment.

FIG. 9 illustrates a block diagram of an example of the power supply system of the image forming apparatus 101 according to the second embodiment. In the power supply system of the image forming apparatus 101 of the first embodiment shown in FIG. 3, only the printer apparatus 104 is controlled, but in the second embodiment, the scanner apparatus 102 and the FAX apparatus 107 are controlled simultaneously by the same power supply switch. Hereinafter, with reference to FIG. 9, a portion related to the present invention will be described with respect to the power supply 301 and the power supply configuration to each apparatus in the image forming apparatus 101 according to the second embodiment. In FIG. 9, reference signs 650 and 660 denote a power supply block.

In the image forming apparatus 101, when the power supply switch 110 is pressed while the power is turned off, the power control unit (not shown) of the controller 103 detects that the power supply switch 110 is pressed and supplies power to the CPU 200 of the controller 103. The started CPU 200 controls the power supply switch 610 to supply power to the printer apparatus 104, the CPU 340 of the printer apparatus 104, the scanner apparatus 102, and the FAX apparatus 107.

When the CPU 200 of the controller 103 determines that the transition to the sleep state is possible, the CPU 200 controls the power supply switch 610 to stop the power supply to the printer apparatus 104, the CPU 340 of the printer apparatus 104, the scanner apparatus 102, and the FAX apparatus 107. On the contrary, upon receiving the resumption event from the sleep state, the CPU 200 of the controller 103 controls the power supply switch 610 to start supplying power to the printer apparatus 104, the CPU 340 of the printer apparatus 104, the scanner apparatus 102, and the FAX apparatus 107.

In the image forming apparatus 101, when the power supply switch 110 is pressed when the power is turned on, the power control unit (not shown) of the controller 103 detects that the power supply switch 110 is pressed and notifies the CPU 200 of the controller 103. The CPU 200 controls the power supply switch 610 to stop power supply to the printer apparatus 104, the CPU 340 of the printer apparatus 104, the scanner apparatus 102, and the FAX apparatus 107. At this time, the CPU 200 may individually control the power supply of the marking unit 141, the sheet feed unit 142, and the discharge unit 143 of the printer apparatus 104, but this configuration will not be explained. In addition, a time lag may occur between when the ON/OFF of the power switch 310 is instructed and when the power of each device is turned OFF. This is because it takes time to discharge the capacitor. This time lag is monitored by the H/W configuration and S/W configuration, and it is guaranteed that the power supply of each device is turned off according to the power switch 110 ON/OFF instruction.

Operation of the Second Embodiment

Figure 10:
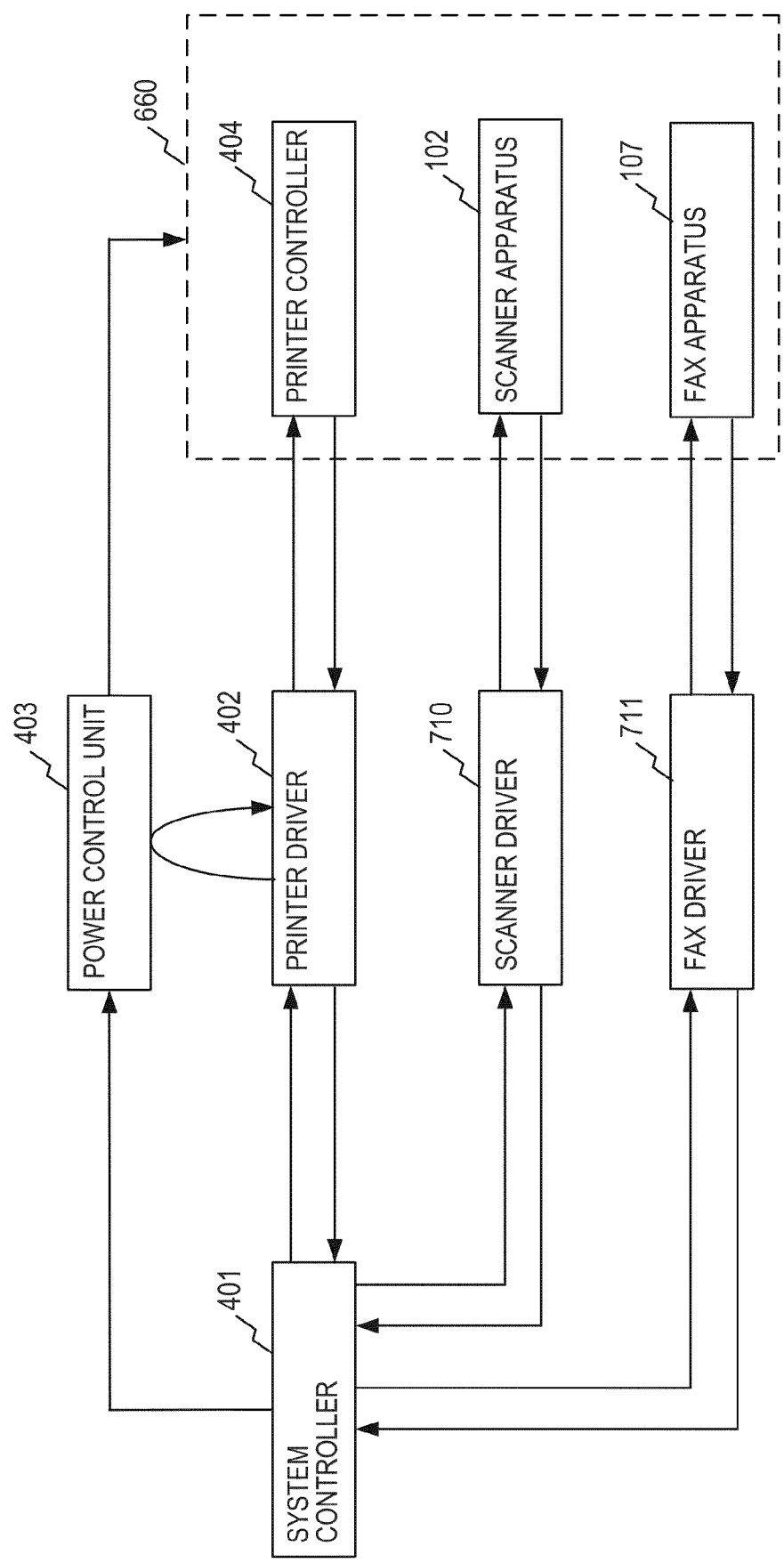
FIG. 10 illustrates a diagram illustrating the sleep transition operation and the resume operation according to the second embodiment.

FIG. 10 illustrates a diagram for explaining the transition operation to the sleep state and the resumption operation from the sleep state of the second embodiment based on the power supply system diagram shown in FIG. 9. The system controller 401 of the second embodiment waits for the completion of the transition to the sleep state of the scanner driver 710 for controlling the scanner apparatus 102 and the FAX driver 711 for controlling the FAX apparatus 107 asynchronously with the completion of sleep notification of the printer driver 402. Therefore, there is a power control timing wait from the completion of the transition to the sleep state of each driver to the time when the system controller 401 performs power control. The scanner driver 710 and the FAX driver 711 operate on the CPU 220 in the same manner as the printer driver 402.

First, the transition to the sleep state will be described. After all the jobs are completed, the system controller 401 starts the transition to the sleep state. The transition to the sleep state may be another event such as the resolution of the sleep prohibited state, but the details are omitted.

When the transition to the sleep state is started, the system controller 401 notifies the printer controller 404 of the transition to the sleep state via the printer driver 402. The printer controller 404 transmits the completion response of the transition to the sleep state to the system controller 401 via the printer driver 402.

In addition, the system controller 401 notifies the scanner driver 710 operating on the CPU 220 of the image forming apparatus 101 of the transition to the sleep state asynchronously with the notification to the printer driver 402. The scanner driver 710 performs the sleep processing of the scanner apparatus 102, and transmits the completion response of the transition to the sleep state to the system controller 401. The system controller 401 notifies the FAX driver 711 operating on the CPU 220 of the image forming apparatus 101 of the transition to the sleep state asynchronously with the notification to the printer driver 402. The FAX driver 711 performs the sleep processing of the FAX apparatus 107 and transmits the completion response of the transition to the sleep state to the system controller 401.

Upon receiving the completion response of the transition to the sleep state from all the apparatuses, the system controller 401 instructs the power control unit 403 to turn off the power of the power supply block 660 including the printer apparatus 104. The power control unit 403 uses the power supply switch 610 to turn off the power of the power supply block 660 including the printer apparatus 104, and latches that the power supply is turned off (the same as in the first embodiment).

The description will be continued on the resumption from the sleep state. After issuing the print job, the system controller 401 starts the resumption from the sleep state. In addition to the print job, the resumption from the sleep state may be performed in another event such as pressing a power saving key, but the details are omitted.

When the system controller 401 receives the resumption from the sleep state, the system controller 401 instructs the power control unit 403 to turn on the power of the printer apparatus 104. The power control unit 403 turns on the power of the power supply block 660 including the printer apparatus 104 by using the power supply switch 610.

The system controller 401 notifies the printer driver 402 of the resumption from the sleep state. The printer driver 402 confirms latch information indicating whether or not the printer apparatus 104 has been turned OFF even once (the power has been turned OFF/ON after the previous transition notification to the sleep state) to the power control unit 403. When it is confirmed that "the power supply is turned off once" from the power supply OFF latch state of the power control unit 403, the printer driver 402 starts the process from initialization negotiation with the printer apparatus 104. On the other hand, when it is confirmed that "the power supply is not turned off at all" from the power supply OFF latch state of the power control unit 403 (when the power supply remains ON), the printer driver 402 skips initialization negotiation with the printer apparatus 104 and performs printing communication. In addition, the system controller 401 notifies the scanner driver 710 and the FAX driver 711 of the resumption from the sleep state, asynchronously with the printer driver 402.

The sequence of the second embodiment is substantially the same as that of the first embodiment. That is, since the system controller 401, the printer driver 402, and the power control unit 403 of the second embodiment perform the same processes as those of FIGS. 6, 7, and 8, respectively, the flowcharts are omitted. As described above, according to the second embodiment, the same effects as those of the first embodiment described above are achieved.

Third Embodiment

Power Supply Configuration of the Third Embodiment

Figure 11:
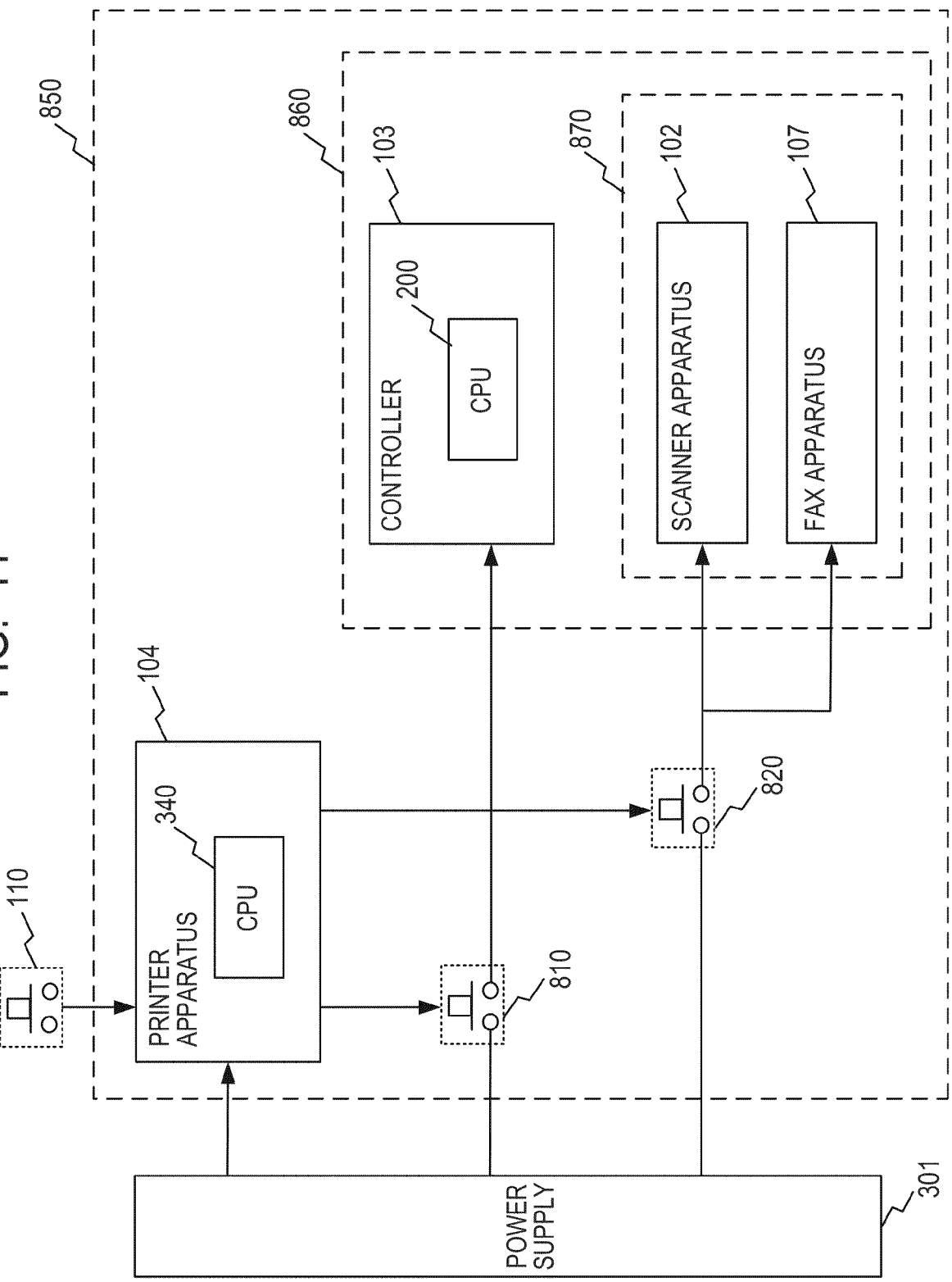
FIG. 11 illustrates a block diagram of an example of the power supply system of the image forming apparatus according to the third embodiment.

FIG. 11 illustrates a block diagram of an example of the power supply system of the image forming apparatus 101 according to the third embodiment. In the power supply system of the image forming apparatus 101 of the first embodiment shown in FIG. 3, the controller 103 controls the power supply of the printer apparatus 104, but in the third embodiment, the printer apparatus 104 controls the power supply of the controller 103. Further, the printer apparatus 104 controls the power source of the scanner apparatus 102 and the FAX apparatus 107. Hereinafter, with reference to FIG. 11, the power supply 301 and the power supply configuration to each apparatus in the image forming apparatus 101 according to the third embodiment will be described with reference to a portion related to the present invention. In FIG. 11, reference signs 850, 860, and 870 denote power supply blocks.

In the image forming apparatus 101, if the power supply switch 110 is pressed when the power is turned off, the CPU 340 of the printer apparatus 104 detects that the power supply switch 110 is pressed. The CPU 340 of the printer apparatus 104 controls the power supply switch 810 to supply power to the controller 103, and controls the power supply switch 820 to supply power to the scanner apparatus 102 and the FAX apparatus 107.

When the CPU 200 of the controller 103 determines that the transition to the sleep state is possible, the CPU 200 of the controller 103 notifies the printer apparatus 104 of a signal. Upon receiving the signal notification, the CPU 340 of the printer apparatus 104 controls the power supply switch 820 to stop power supply to the scanner apparatus 102 and the FAX apparatus 107. Upon receiving the sleep notification, the CPU 340 of the printer apparatus 104 controls the power supply switch 810 to stop feeding power to a part of the controller 103. At this time, the controller 103 may stop the power supply to the CPU 200 and the CPU peripheral of the controller 103, and may suspend the power supply to the devices that resume from the sleep state such as the memory 201 and the network chip. Further, the CPU 340 of the printer apparatus 104 can suspend the memory 201, the network chip, and the like by continuing power supply without controlling the power supply switch 810 and controlling the power supply in the controller even when receiving the signal notification.

On the contrary, the CPU 200 of the controller 103 notifies the printer apparatus 104 of the signal upon receiving the resumption notification from the sleep state. Upon receiving the signal notification, the CPU 340 of the printer apparatus 104 controls the power supply switch 820 to start supplying power to the scanner apparatus 102 and the FAX apparatus 107. Further, the CPU 340 of the printer apparatus 104 receives the resumption notification from the sleep state, controls the power supply switch 810, and starts supplying power to a part of the controller 103. At this time, the controller 103 can start supplying power to the CPU 200 and CPU peripherals of the controller 103 to resume the CPU 200 and CPU peripherals of the controller 103 from the sleep state.

In the image forming apparatus 101, if the power supply switch 110 is pressed when the power is turned on, the CPU 340 of the printer apparatus 104 detects that the power supply switch 110 is pressed. The CPU 340 of the printer apparatus 104 controls the power supply switch 820 to stop power supply to the scanner apparatus 102 and the FAX apparatus 107, and controls the power supply switch 810 to stop power supply to the controller 103. At this time, the CPU 340 of the printer apparatus 104 can individually control the power supply of the marking unit 141, the sheet feed unit 142, and the discharge unit 143 of the printer apparatus 104, but this will not be explained. In addition, a time lag may occur between when the ON/OFF of the power switch 310 is instructed and when the power of each device is turned OFF. This is because it takes time to discharge the capacitor. This time lag is monitored by the H/W configuration and S/W configuration, and it is guaranteed that the power supply of each device is turned off according to the power switch 110 ON/OFF instruction.

Operation of the Third Embodiment

FIG. 12 illustrates a diagram of the sleep transition operation and the resumption operation of the third embodiment based on the power supply system diagram shown in FIG. 11. In the third embodiment, the same sequence as that in the first embodiment can be used at the time of entering the sleep state. In the third embodiment, the system controller 401 transmits a signal to the printer controller 404 via the power control unit 403 at the time of the transition to the sleep state, and the printer controller 404 turns off the power supply block 870. Even in such a complicated configuration, the printer driver 402 can confirm whether or not the device power is turned off to the power control unit 403 at the time of resumption from the sleep state, and execute a process of determining whether or not initialization negotiation is necessary.

First, the transition to the sleep state will be described. The system controller 401 operating on the CPU 200 of the image forming apparatus 101 starts a transition to the sleep state after all jobs are completed. The transition to the sleep state may be another event such as the resolution of the sleep prohibited state, but the details are omitted. The system controller 401 notifies the printer controller 404 of the transition to the sleep state via the printer driver 402 operating on the CPU 220 of the image forming apparatus 101. The printer controller 404 transmits the completion response of the transition to the sleep state to the system controller 401 via the printer driver 402.

The system controller 401 also notifies the scanner driver 710 operating on the CPU 220 of the image forming apparatus 101 of the transition to the sleep state asynchronously with the notification to the printer driver 402. The scanner driver 710 performs sleep processing of the scanner apparatus 102 and transmits the completion response of the transition to the sleep state to the system controller 401.

The system controller 401 also notifies the FAX driver 711 operating on the CPU 220 of the image forming apparatus 101 of the transition to the sleep state asynchronously with the notification to the printer driver 402. The FAX driver 711 performs the sleep processing of the FAX apparatus 107 and transmits the completion response of the transition to the sleep state to the system controller 401.

Upon receiving the completion response of the transition to the sleep state from all the devices, the system controller 401 instructs the power control unit 403 to turn off the power. In response to this instruction, the power control unit 403 notifies the printer controller 404 of the signal and latches that the power supply is OFF. Upon receiving the signal notification, the printer controller 404 uses the power supply switch 820 to turn off the power of the power supply block 870 including the scanner apparatus 102 and the FAX apparatus 107. At this time, the CPU 340 of the printer apparatus 104 can turn off the marking unit 141, the sheet feed unit 142, and the discharge unit 143 of the printer apparatus 104 individually, but a description thereof will be omitted.

The description will be continued on the resumption from the sleep state. After issuing the print job, the system controller 401 starts the resumption from the sleep state. In addition to the print job, the resumption from the sleep state may be performed in another event such as pressing a power saving key, but the details are omitted.

The system controller 401 instructs the power control unit 403 to turn on the power when receiving the resumption from the sleep state. The power control unit 403 notifies the printer controller 404 that the power is ON. Upon receiving the signal notification, the printer controller 404 turns on the power supply of the power supply block 870 including the scanner apparatus 102 and the FAX apparatus 107 by using the power supply switch 820. At this time, the CPU 340 of the printer apparatus 104 can turn on the marking unit 141, the sheet feed unit 142, and the discharge unit 143 of the printer apparatus 104 individually.

The system controller 401 notifies the printer driver 402 of the resumption from the sleep state. The printer driver 402 confirms with the power control unit 403 a latched state indicating whether or not the printer apparatus 104 has been turned off even once (the power has been turned off/on after the previous notification of the transition to the sleep state). When it is confirmed that "the power supply is turned off once" from the power supply OFF latch state of the power control unit 403, the printer driver 402 starts the process from initialization negotiation with the printer apparatus 104. On the other hand, when it is confirmed that "the power supply is not turned off at all" from the power supply OFF latch state of the power control unit 403 (when the power supply remains ON), the printer driver 402 skips initialization negotiation with the printer apparatus 104 and performs printing communication. In addition, the system controller 401 notifies the scanner driver 710 and the FAX driver 711 of the resumption from the sleep state, asynchronously with the printer driver 402.

The sequence of the third embodiment is substantially the same as that of the first embodiment. That is, since the system controller 401, the printer driver 402, and the power control unit 403 of the second embodiment perform the same processes as those of FIGS. 6, 7, and 8, respectively, the flowcharts are omitted. As described above, according to the third embodiment, the same effects as those of the first embodiment described above are achieved.

Hereinafter, specific examples will be used. For example, the present invention will be described with reference to a sequence in which the image forming apparatus 101 executes a plurality of print jobs. The execution sequence of a plurality of print jobs performed by the controller 103 of the image forming apparatus 101 has two patterns (pattern 1 and pattern 2). The pattern 1 is a pattern for continuously executing two print jobs. The pattern 2 is a pattern for separately executing two print jobs.

In the pattern 1, the power supply to the printer apparatus 104 is continued while the two print jobs are executed, and the printing processing can be continued, so that printing can be performed at the fastest speed. On the other hand, in the pattern 2, since the two print jobs are separately executed, there is a case where the pattern 2 transitions to the sleep state and resumes from the sleep state in the interval of the two print jobs. That is, in the pattern 2, there is a case where the power supply to the printer apparatus 104 is interrupted between the two print jobs and the initialization negotiation process is started at the time of resuming. In this case, the printing completion time is extended as compared with the pattern 1.

When the power supply to the printer apparatus 104 is turned off, it takes a long time until the power supply waveform falls off, and when the power supply to the printer apparatus 104 is turned on again, it takes a long time until the power supply waveform rises. As a result, when the power supply to the printer apparatus 104 is turned off (pattern 2), it takes longer to start printing after the power supply is turned off than when printing is continuously performed (pattern 1), and the time to complete printing is extended. Therefore, if printing can be continuously performed in the pattern 2 without turning off the power supply to the printer apparatus 104 as much as possible, the time until the completion of printing can be shortened.

The pattern 2 will be described in more detail. The power saving process (the sleep processing) of the printer apparatus 104 includes a series of sequences in which the printer apparatus 104 is notified of the transition to the sleep state, a response is received, and then the printer apparatus 104 is turned off. Therefore, the pattern 2 is divided into three timings (timing A, B, and C).

The timing A corresponds to a timing before the transition notification to the sleep state is transmitted to the printer apparatus 104. The timing B corresponds to a timing from the time when the transition notification to the sleep state is transmitted to the printer apparatus 104 to the time before the power of the printer apparatus 104 is turned off. The timing C corresponds to the timing after the power of the printer apparatus 104 is turned off.

When the second print job is received at the timing A, the printer apparatus 104 can continue to operate in the same manner as the processing of the pattern 1. When the second print job is received at the timing C, the power supply of the printer apparatus 104 is turned off as in the process of the pattern 2, so that the power supply of the printer apparatus 104 is turned on to perform the initialization negotiation process. On the other hand, when the second print job is received at the timing B, the initialization negotiation process is performed because the transition notification to the sleep state to the printer apparatus 104 has already been performed even though the power of the printer apparatus 104 has not yet been turned off.

Here, the timing B will be described in more detail with reference to an example in which the power supply switches of a plurality of apparatuses including the printer apparatus 104 are combined into one as in the second embodiment.

When the system controller 401 determines the transition to the sleep state, the printer driver 402 controlling the printer apparatus 104 notifies the printer apparatus 104 of the transition to the sleep state and confirms the completion notification. Simultaneously or asynchronously, the scanner driver 710 confirms with the scanner apparatus 102 and the FAX driver 711 confirms with the FAX apparatus 107 whether the sleep processing is completed or not. Thereafter, the system controller 401 confirms that all the sleep processing is completed, and turns off the power of the plurality of apparatuses. At this time, the printer driver 402 does not know when the power of the printer apparatus 104 is actually turned off because the completion of sleep processing of the printer apparatus 104 and the completion of sleep processing of the plurality of apparatuses are asynchronous. Therefore, in the prior art, since the printer driver 402 receives the print job and resumes before the printer apparatus 104 is turned off after notifying the transition to the sleep state to the printer apparatus 104, it is necessary to perform initialization negotiation even if initialization negotiation is not necessary. However, according to the present invention, when the power control unit 403 latches that the power supply of the printer apparatus 104 has been turned off once, the printer driver 402 can skip unnecessary initialization negotiation processing and continue operation.

As described above, conventionally, when two print jobs are separated, the sleep processing and the wake-up processing are performed in the middle, thereby delaying the time until the start of printing. As a result, as a result of the delay in the start of printing, the time until the completion of printing is delayed, and the time until the user can obtain the print product may be delayed. On the other hand, in the present invention, the power control unit 403 latches that the power of the printer apparatus 104 has been turned off once. When receiving the print job during the transition to the sleep state, cancelling the transition to the sleep, and resuming from the sleep state, the printer driver 402 confirms whether or not the power supply of the printer apparatus 104 or a related apparatus is turned off based on the latched state of the power control unit 403. At this time, if the power is never turned off, the printer driver 402 passes (skips) the initialization negotiation with the printer apparatus 104. With such a configuration, when the printer apparatus 104 is not turned off even once after the previous notification of the transition to the sleep state is made upon the resumption from the sleep state, the initialization negotiation with the printer apparatus 104 can be omitted. As a result, the time to resume from the sleep state is earlier, and the print completion is earlier.

As described above, the image forming apparatus 101 checks whether the power supply of the printer apparatus 104 and the related apparatuses is turned off when the apparatus is resumed from the sleep state. When the printer apparatus 104 or the like is not turned off (when the power is kept on), the initialization negotiation with the printer apparatus 104 passes. As a result, when receiving the print job during the transition to the sleep state, cancelling the sleep transition, and resuming from the sleep state, the time to resume from the sleep state is accelerated and the print completion is accelerated.

In the above embodiments, when the power supply of the printer apparatus 104 is turned off after the notification of the transition to the sleep state, the power control unit 403 latches that the power supply of the printer apparatus 104 is turned off. When the printer driver 402 receives the notification of the resumption from the sleep state and the power of the printer apparatus 104 is not turned off after the previous notification of the transition to the sleep state based on checking with the power control unit 403, the initialization negotiation is cancelled. However, the holding of information on whether or not the power supply of the printer apparatus 104 is turned off after the notification of the transition to the sleep state is not limited to the latch of the power control unit 403. Any configuration may be used as long as the printer driver 402 can be checked at the time of the resumption from the sleep state. For example, when the system controller 401 notifies the power control unit 403 that the power supply of the printer apparatus 104 is turned off, information of turning off is held. At the time of resumption from the sleep state, the held information is confirmed, and a first resumption notice is transmitted to the printer driver 402 when the power OFF notice is transmitted, and a second resumption notice is transmitted when the power OFF notice is not transmitted. When receiving the first resumption notification from the system controller 401, the printer driver 402 performs initialization negotiation processing with the printer apparatus 104, and then communicates with the printer apparatus 104. On the other hand, when receiving the second resumption notification from the system controller 401, the printer driver 402 may skip the initialization negotiation process and communicate with the printer apparatus 104.

As described above, in each embodiment of the present invention, upon receiving a resume notification from the system controller 401, the printer driver 402 determines whether the power supply to the printer apparatus 104 has stopped/resumed after the previous sleep transition instruction was transmitted to the printer apparatus 104 (print engine). If stop/resumption has not been performed, control is performed so that initialization processing (initialization negotiation) performed to the printer apparatus 104 when stop/resumption is not performed. With this configuration, unnecessary initialization processing at the time of the resumption from the sleep state of the image forming apparatus is eliminated, and the image forming apparatus can be quickly resumed from the sleep state. As a result, the printing process is quickly started, and the time until the user obtains the print product can be shortened. Thus, usability can be improved.

The configuration and contents of the various data described above are not limited thereto, and it is needless to say that the various configurations and contents are configured according to the use and purpose. Although one embodiment has been described above, the present invention may be implemented, for example, as a system, apparatus, method, program, or storage medium. Specifically, the present invention may be applied to a system comprising a plurality of apparatuses, or may be applied to an apparatus comprising one apparatus. Further, all of the configurations in which the above embodiments are combined are also included in the present invention.

According to the present invention, the wasteful processing at the time of the resumption from the sleep state of the image forming apparatus can be eliminated, the image forming apparatus can be quickly resumed from the sleep state, and the user's usability can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus, including a printer unit, capable of switching between a first power state in which power is supplied to the printer unit and a second power state in which the power is not supplied to the printer unit, and comprising:
    a memory; and
    at least one processor in communication with the memory, wherein the at least one processor is configured to:
        control the image forming apparatus; and
        control the printer unit to transmit first instruction to the printer unit in response to receiving the first instruction to transition to the second power state and resume communication with the printer unit in response to receiving second instruction to transition to the first power state,
    wherein an initialization processing of the printer unit is executed by second the first instruction to the printer which is received when the power supply to the printer unit is stopped by first the first instruction and the resumed, wherein the initialization processing of the printer unit is not executed by second the first instruction to the printer which is received when the power supply to the printer unit is still supplied by first the first instruction.

2. The image forming apparatus according claim 1, wherein the at least one processor is further configured to hold information to determine whether or not the power supply to the printer is stopped in a case where the image forming apparatus transitions to the second power state, wherein it is determined whether or not the power supply to the printer unit is stopped by first the first instruction and resumed after transmitting the second the first instruction based on the held information.

3. The image forming apparatus according to claim 2, wherein the power supply to the printer unit is stopped after transmitting the first instruction and the second instruction is transmitted after resuming the power supply to the printer unit.

4. The image forming apparatus according to claim 3, wherein a plurality of devices including the printer unit are controlled to supply the power.

5. The image forming apparatus according to claim 4, wherein the at least one processor is further configured to:
    transmit the first instruction for controlling the plurality of devices; and
    instruct to stop the power supply to the printer unit when receiving a response for the first instruction.

6. A control method for controlling an image forming apparatus including a printer unit, capable of switching between a first power state in which power is supplied to the printer unit and a second power state in which the power is not supplied to the printer unit, and comprising:
    notifying the printer unit of first instruction in response to receiving the first instruction to transition to the second power state; and
    controlling to resume communication with the printer unit in response to receiving second instruction to transition to the first power state,
    wherein an initialization processing of the printer unit is executed by second the first instruction to the printer which is received when the power supply to the printer unit is stopped by first the first instruction and the resumed,
    wherein the initialization processing of the printer unit is not executed by second the first instruction to the printer which is received when the power supply to the printer unit is still supplied by first the first instruction.

7. A non-transitory computer-readable storage medium storing program to cause a computer to perform a control method for controlling an image forming apparatus including a printer unit, capable of switching between a first power state in which power is supplied to the printer unit and a second power state in which the power is not supplied to the printer unit, and comprising:
    notifying the printer unit of first instruction in response to receiving the first instruction to transition to the second power state; and
    controlling to resume communication with the printer unit in response to receiving second instruction to transition to the first power state,
    wherein an initialization processing of the printer unit is executed by second the first instruction to the printer which is received when the power supply to the printer unit is stopped by first the first instruction and the resumed, wherein the initialization processing of the printer unit is not executed by second the first instruction to the printer which is received when the power supply to the printer unit is still supplied by first the first instruction.

* * * * *